US011755711B2

(12) United States Patent
Wang et al.

(10) Patent No.: US 11,755,711 B2
(45) Date of Patent: Sep. 12, 2023

(54) METHOD, BIOMETRIC SENSOR AND BIOMETRIC DETECTING SYSTEM FOR DETECTING A BIOMETRIC FEATURE OF HUMANS

(71) Applicants: William Wang, New Taipei (TW); Yu-Sung Su, New Taipei (TW)

(72) Inventors: William Wang, New Taipei (TW); Yu-Sung Su, New Taipei (TW)

(*) Notice: Subject to any disclaimer, the term of this patent is extended or adjusted under 35 U.S.C. 154(b) by 0 days.

(21) Appl. No.: 17/811,506

(22) Filed: Jul. 8, 2022

(65) Prior Publication Data
US 2023/0020392 A1 Jan. 19, 2023

(30) Foreign Application Priority Data

Jul. 15, 2021 (TW) ................. 110126059

(51) Int. Cl.
*G06V 40/13* (2022.01)
*G06F 21/32* (2013.01)
*G07C 9/37* (2020.01)

(52) U.S. Cl.
CPC .......... *G06F 21/32* (2013.01); *G06V 40/1306* (2022.01); *G07C 9/37* (2020.01)

(58) Field of Classification Search
CPC ..................................... G06V 40/13
See application file for complete search history.

(56) References Cited

U.S. PATENT DOCUMENTS

| 10,311,275 | B2* | 6/2019 | Hong ................. G06V 40/1365 |
| 10,845,910 | B1 | 11/2020 | Lin |
| 2016/0292488 | A1 | 10/2016 | Ran et al. |
| 2019/0102006 | A1 | 4/2019 | Suzuki et al. |
| 2020/0125817 | A1* | 4/2020 | Kim ..................... G06V 10/993 |
| 2020/0193128 | A1* | 6/2020 | Son .................... G06V 40/1335 |
| 2021/0055822 | A1 | 2/2021 | Small et al. |

FOREIGN PATENT DOCUMENTS

TW M572496 U 1/2019

OTHER PUBLICATIONS

Search Report appended to an Office Action, which was issued to Taiwanese counterpart application No. 110126059 by the TIPO dated Jan. 17, 2023, with an English translation thereof.
Search Report issued to European Counterpart Application No. 22184749.4 by the EPO dated Dec. 13, 2022.

* cited by examiner

*Primary Examiner* — Joseph R Haley
(74) *Attorney, Agent, or Firm* — Rosenberg, Klein & Lee

(57) ABSTRACT

A method for detecting a biometric feature of humans includes a steps of: dividing signal lines into a plurality of input groups each including a number m of consecutive ones of the signal lines; dividing scan lines into a plurality of output groups each including a number n of consecutive ones of the scan lines such that a plurality of electrode patterns are formed and each is formed by one of the input groups and one of the output groups; outputting a detecting signal to the input groups sequentially; scanning the output groups sequentially; and reading out a plurality of electrical signals respectively of the electrode patterns. The values of m and n can be adjusted to meet various resolution needs.

14 Claims, 6 Drawing Sheets

METHOD, BIOMETRIC SENSOR AND BIOMETRIC DETECTING SYSTEM FOR DETECTING A BIOMETRIC FEATURE OF HUMANS

CROSS-REFERENCE TO RELATED APPLICATION

This application claims priority of Taiwanese Patent Application No. 110126059, filed on Jul. 15, 2021.

FIELD

The disclosure relates to a method, a biometric sensor and a biometric detecting system for detecting a biometric feature of humans.

BACKGROUND

A conventional fingerprint sensor includes a plurality of signal lines arranged along an x-direction, a plurality of scan lines arranged along a y-direction which is perpendicular to the x-direction, and a processing unit connected to the signal lines and the scan lines. Intersections of the signal lines and the scan lines form a plurality of sensing elements. The processing unit sequentially transmits a signal to the signal lines from the first one of the signal lines to the last one of the signal lines that are arranged along the x-direction, and sequentially scans the scan lines from the first one of the scan lines to the last one of the scan lines that are arranged along the y-direction to obtain a plurality of detecting signals respectively from the sensing elements.

However, fingerprint sensors used for different purposes require different resolutions. For example, a fingerprint sensor used on an exterior door of a house only needs tens feature points of a fingerprint for authentication, and thus requires a relatively low resolution, which means an area of each sensing element of the fingerprint sensor is relatively large; a fingerprint sensor for a financial service needs more feature points for authentication, and thus requires a higher resolution, which means an area of each sensing element of the fingerprint is smaller; a fingerprint sensor for accessing national defense information needs at least hundreds of feature points of a fingerprint or a palm print for accurate authentication to prevent data leakage, and thus requires an even higher resolution.

Since fingerprint sensors with different resolutions must be designed and developed for the above-mentioned different applications, the manufacturing cost is relatively high and each individually designed fingerprint sensor comes with only one resolution. In addition, conventional fingerprint sensors cannot be used as touch foils. Therefore, the usage of the conventional fingerprint sensor is limited.

SUMMARY

Therefore, an object of the disclosure is to provide a method that can alleviate at least one of the drawbacks of the prior art.

According to one embodiment of the disclosure, there is provided a method for detecting a biometric feature of humans, to be implemented by a biometric detecting system that includes a biometric sensor. The biometric sensor includes a number M of signal lines that are arranged along a first direction and spaced apart from one another, and a number N of scan lines that are arranged along a second direction perpendicular to the first direction and spaced apart from one another, and each of the scan lines intersects with the signal lines.

The method includes steps, by the biometric sensor, of:
dividing the signal lines into a plurality of input groups each having a number m of consecutive ones of the signal lines, where m is smaller than M;
dividing the scan lines into a plurality of output groups each having a number n of consecutive ones of the scan lines such that a plurality of electrode patterns are formed and each of the electrode patterns is formed by one of the input groups and one of the output groups, where n is smaller than N and at least one of n or m is greater than one;
outputting a detecting signal to the input groups of the signal lines sequentially from a first one of the input groups to a last one of the input groups that are arranged along the first direction in a manner that, for each of the input groups, the detecting signal is outputted to the signal line(s) in the input group simultaneously;
scanning the output groups of the scan lines sequentially from a first one of the output groups to a last one of the output groups that are arranged along the second direction in a manner that, for each of the output groups, the scan line(s) in the output group is(are) scanned simultaneously; and
reading out a plurality of electrical signals respectively of the electrode patterns based on the scanning of the output groups of the scan lines.

Another object of the disclosure is to provide a biometric sensor that can alleviate at least one of the drawbacks of the prior art.

According to one embodiment of the disclosure, the biometric sensor includes a detecting module and a processing module.

The detecting module includes a first detecting unit and a second detecting unit. The first detecting unit includes a number M of signal lines that are arranged along a first direction and spaced apart from one another. The second detecting unit includes a number N of scan lines that are arranged along a second direction perpendicular to the first direction and spaced apart from one another, and each of the scan lines intersects with the signal lines.

The processing module includes a setting unit, a scanning unit and a reading unit.

The setting unit is configured to set a first number m for dividing the signal lines into a plurality of input groups each having the number m of consecutive ones of the signal lines, and to set a second number n for dividing the scan lines into a plurality of output groups each having the number n of consecutive ones of the scan lines such that a plurality of electrode patterns are formed and each of the electrode patterns is formed by one of the input groups and one of the output groups, where m is smaller than M, n is smaller than N, and at least one of n or m is greater than one.

The scanning unit is configured to output a detecting signal to the input groups of the signal lines sequentially from a first one of the input groups to a last one of the input groups that are arranged along the first direction in a manner that, for each of the input groups, the detecting signal is outputted to the signal line(s) in the input group simultaneously, and scan the output groups of the scan lines sequentially from a first one of the output groups to a last one of the output groups that are arranged along the second direction in a manner that, for each of the output groups, the scan line(s) in the output group is(are) scanned simultaneously.

The reading unit is configured to read out a plurality of electrical signals respectively of the electrode patterns based on the scanning of the output groups of the scan lines.

Another object of the disclosure is to provide a biometric detecting system that can alleviate at least one of the drawbacks of the prior art.

According to one embodiment of the disclosure, the biometric detecting system includes the above-mentioned biometric sensor, and a biometric authentication device that is coupled to the biometric sensor and that includes an image-capturing unit configured to convert the electrical signals into image data.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
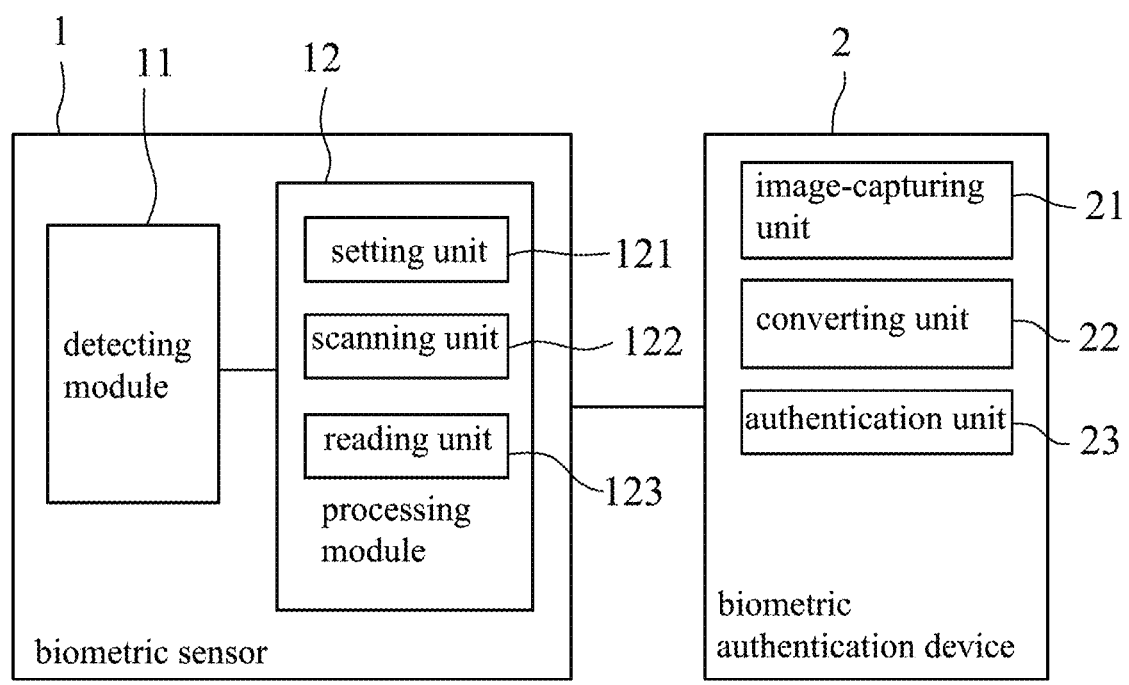
FIG. 1 is a block diagram illustrating a biometric detecting system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 2:
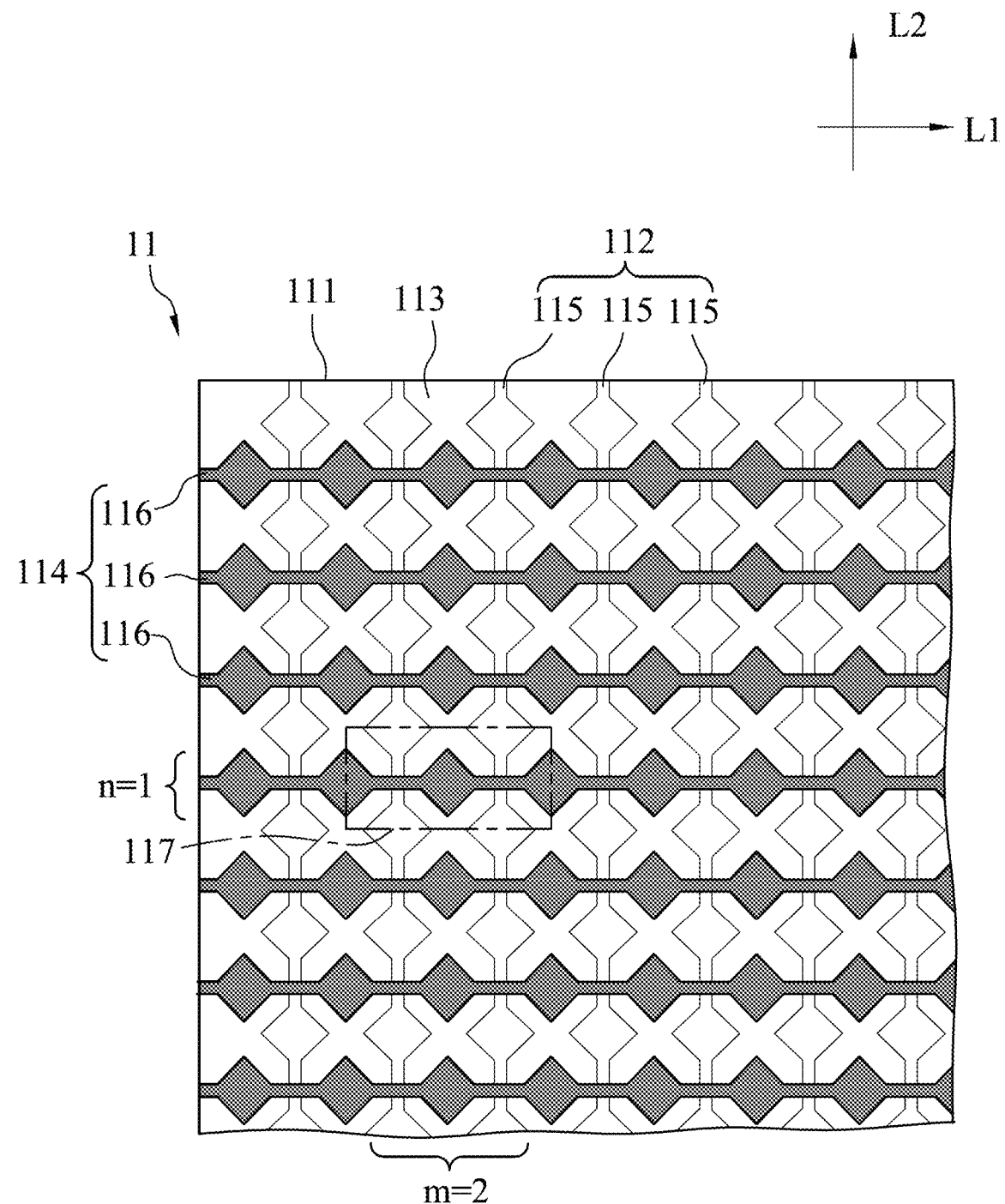
FIG. 2 is a fragmentary schematic view illustrating an example of a detecting module of the biometric detecting system according to the embodiment.

Referring to FIGS. 1 and 2, according to one embodiment of the disclosure, a biometric detecting system is used for detecting and authenticating a biometric feature of humans. The biometric detecting system includes a biometric sensor 1 for detecting a biometric feature of a human body part, and a biometric authentication device 2 coupled to the biometric sensor 1. The human body part may be a finger or a palm, in which case the biometric feature is a fingerprint or a palm print.

The biometric sensor 1 includes a detecting module 11 and a processing module 12.

Figure 6:
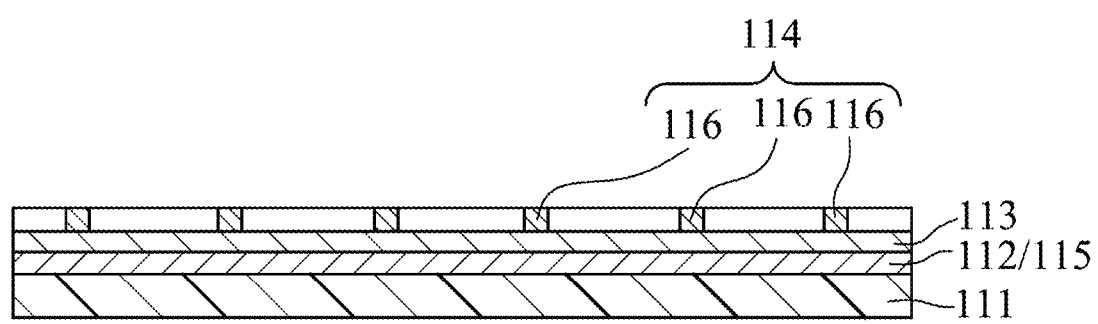
FIG. 6 is a cross-sectional view of the detecting module according to one embodiment.

The detecting module 11 is configured for detecting the biometric feature, and includes a substrate 111, a first detecting unit 112, a dielectric film 113 and a second detecting unit 114 which are stacked together from bottom to top in a vertical direction (see FIG. 6). The first detecting unit 112 includes a number M of signal lines 115 that are disposed on the substrate 111 and spaced apart from one another in a first direction L1, where M is a positive integer.

Each of the signal lines 115 extends along a second direction L2 that is perpendicular to the first direction L1. Specifically, the first direction L1 and the second direction L2 are both perpendicular to the vertical direction. The dielectric film 113 covers the signal lines 115 entirely. The second detecting unit 114 includes a number N of scan lines 116 that are disposed on the top surface of the dielectric film 113 and spaced apart from one another in the second direction L2, where N is a positive integer. Each of the scan lines 116 extends along the first direction L1, and is perpendicular to and spaced apart from the signal lines 115. The dielectric film 113 is sandwiched between the first detecting unit 112 and the second detecting unit 114. The signal lines 115 and the scan lines 116 may be made of transparent conductive material, conductive metal material or conductive alloy material.

The processing module 12 is, for example, a sensing integrated circuit (IC) or a chip (e.g., a current sensor IC), and may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc. The processing module 12 is connected to the detecting module 11, and includes a setting unit 121, a scanning unit 122 and a reading unit 123. In various embodiments, each of the setting unit 121, the scanning unit 122 and the reading unit 123 may be implemented in one or a combination of hardware, firmware and software. Other embodiments of each of these units 121-123 may also be implemented as instructions stored on a computer-readable storage medium, which may be read and executed by one or more processors to perform the corresponding operations as will be described herein. A computer-readable storage medium may include any non-transitory memory mechanism for storing information in a form readable by a machine (e.g., a computer). For example, a computer-readable storage medium may be read-only memory (ROM), random-access memory (RAM), magnetic disk storage devices, optical storage devices, flash-memory devices, or other storage devices or media.

The setting unit 121 is configured to set a first number m for dividing the signal lines 115 into a plurality of input groups each having the number m of consecutive ones of the signal lines 115, and to set a second number n for dividing the scan lines 116 into a plurality of output groups each having the number n of consecutive ones of the scan lines 116, where the first number m is a positive integer smaller than M, the second number n is a positive integer smaller than N, and at least one of the first number m or the second number n is greater than one (i.e., m is greater than one, or n is greater than one, or both m and n are greater than one). Accordingly, a plurality of electrode patterns 117 are formed and each is formed at an intersection of one of the input groups and one of the output groups. In some embodiments, a user may use an input device (e.g., a keyboard) to input numerical values, and the setting unit 121 is configured to set the first number m and the second number n according to the numerical values thus inputted. When the number of the signal lines 115 is not divisible by the first number (i.e., M is not divisible by m), the last one of the input groups may include a number of consecutive one(s) of the signal lines 115 with the number being less than m and equal to the remainder of M divided by m. Similarly, when the number of the scan lines 116 is not divisible by the second number (i.e., N is not divisible by n), the last one of the output groups may include a number of consecutive one(s) of the scan lines 116 with the number being less than n and equal to the remainder of N divided by n.

The scanning unit 122 is configured to output a detecting signal to the input groups of the signal lines 115 sequentially from a first one of the input groups to a last one of the input groups that are arranged along the first direction L1 in a manner that, for each of the input groups, the detecting signal is outputted to the signal line(s) 115 in the input group simultaneously. The scanning unit 122 is further configured to scan the output groups of the scan lines 116 sequentially from a first one of the output groups to a last one of the output groups that are arranged along the second direction L2 in a manner that, for each of the output groups, the scan lines 116, if plural, in the output group are scanned simultaneously.

In an example of this embodiment shown in FIG. 2, m is two (m=2) and n is one (n=1); that is to say, each input group has adjacent two signal lines 115, and each output group has only one scan line 116. Each electrode pattern 117 is formed at an area covering intersections of the adjacent two signal lines 115 of the corresponding input group and one scan line 116 (as indicated by a dashed-line box in FIG. 2).

Figure 3:
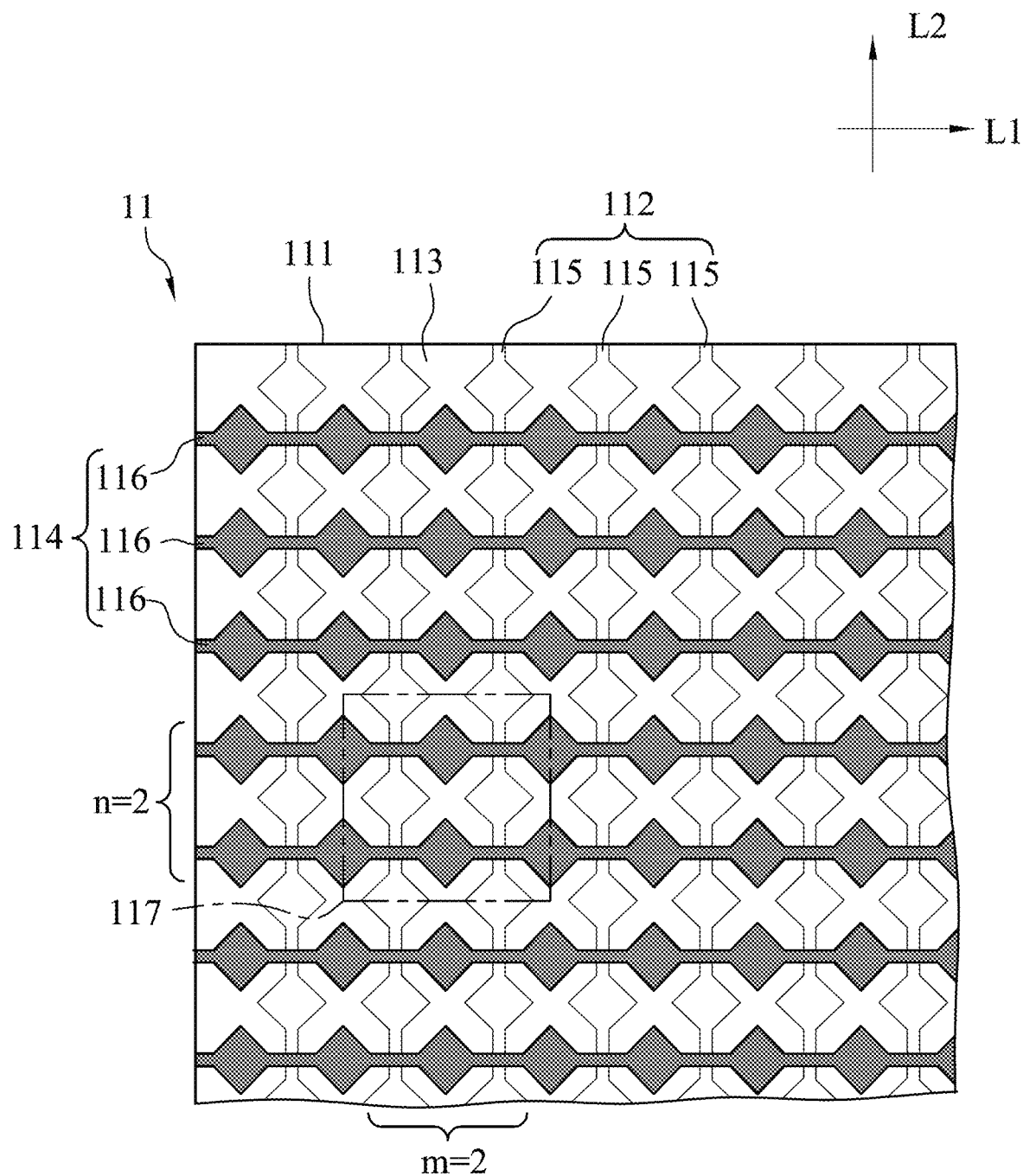
FIG. 3 is a fragmentary schematic view illustrating another example of the detecting module according to the embodiment.

In another example of this embodiment shown in FIG. 3, m is two (m=2) and n is two (n=2); that is to say, each input group has adjacent two signal lines 115, and each output group has adjacent two scan lines 116. Each electrode pattern 117 is formed at an area covering intersections of the adjacent two signal lines 115 of the corresponding input group and the adjacent two scan lines 116 of the corresponding output group (as indicated by a dashed-line box in FIG. 3).

Figure 4:
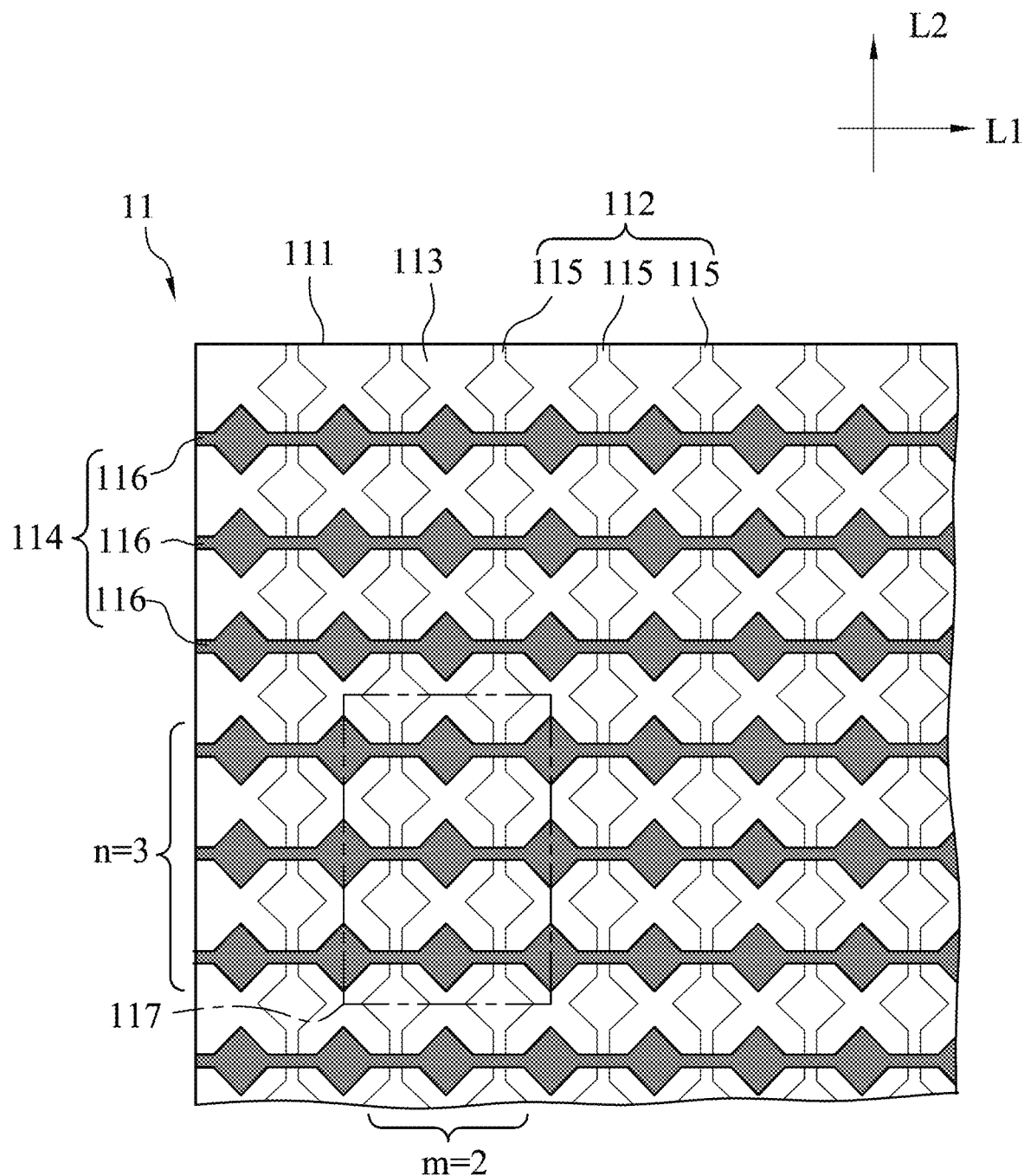
FIG. 4 is a fragmentary schematic view illustrating yet another example of the detecting module according to the embodiment.

In yet another example of this embodiment as shown in FIG. 4, m is two (m=2) and n is three (n=3); that is to say, each input group has adjacent two signal lines 115, and each output group has consecutive three scan lines 116. Each electrode pattern 117 is formed at an area covering intersections of the adjacent two signal lines 115 of the corresponding input group and the consecutive three scan lines 116 of the corresponding output group (as indicated by a dashed-line box in FIG. 4).

The reading unit 123 is configured to read out a plurality of electrical signals respectively of the electrode patterns 117 based on the scanning of the output groups of the scan lines 116. More specifically, for each electrode pattern 117, a capacitor is formed by the input group and the output group that form the electrode pattern 117 and the dielectric film 113 between the input group and output group, and the reading unit 123 is configured to obtain a variation in electric field of the capacitor of the electrode pattern 117 as the electrical signal.

The biometric authentication device 2 includes an image-capturing unit 21, a converting unit 22, and an authentication unit 23. In this embodiment, the biometric authentication device 2 is an integrated circuit capable of converting the electrical signals into image data and authenticating the biometric feature according to the image data.

The image-capturing unit 21 is configured to convert the electrical signals of the electrode patterns 117, obtained from the reading unit 123, into image data and transmit the image data to the converting unit 22. In this embodiment, the image data is a fingerprint image.

The converting unit 22 is configured to use an algorithm of image analysis to analyze the image data to obtain a biometric feature (i.e., a fingerprint). Specifically, the biometric feature thus obtained has a plurality of feature points.

The authentication unit 23 stores a feature dataset that is related to a fingerprint having a plurality of reference points, and is configured to use an algorithm to determine whether arrangement of the feature points of the biometric feature obtained from the converting unit 22 is similar to arrangement of the reference points of the feature dataset.

Figure 5:
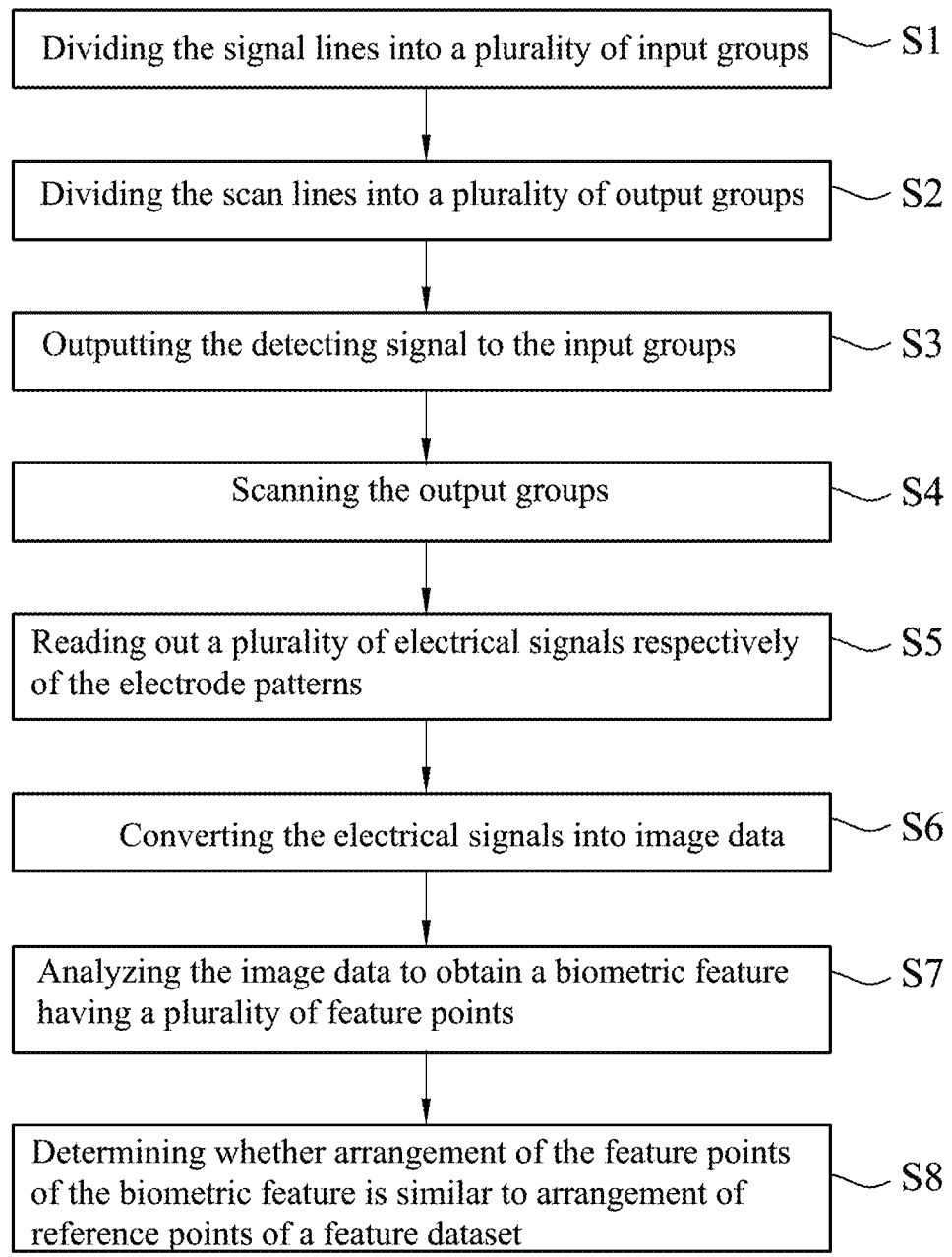
FIG. 5 is a flow chart illustrating a method for detecting a biometric feature of humans according to one embodiment of the disclosure.

Referring to FIGS. 1, 2 and 5, according to one embodiment of the disclosure, a method for detecting and authenticating a biometric feature of humans is implemented by the biometric detecting system. The method includes steps described below.

In step S1, the processing module 12 of the biometric sensor 1 divides the M number of signal lines 115 into a plurality of input groups each having the number m of consecutives ones of the signal lines 115, where m is smaller than M.

In step S2, the processing module 12 of the biometric sensor 1 divides the N number of scan lines 116 into a plurality of output groups each having the number n of consecutives ones of the scan lines 116, where n is smaller than N, and one or both of m and n is greater than one. In some examples of this embodiment, m is not equal to n. In some other examples of this embodiment, m is equal to n. With steps S1 and S2 performed, a plurality of electrode patterns 117 are formed and each is formed by one of the input groups and one of the output groups.

It should be noted that steps S1 and S2 are not executed in any specific order and may be executed simultaneously, and that it may not be necessary for the following steps S3 to S8 to be executed immediately after steps S1 and S2. That is to say, steps S1 and S2 may be executed in advance.

In step S3, the scanning unit 122 of the processing module 12 of the biometric sensor 1 outputs the detecting signal to the input groups sequentially from a first one of the input groups to a last one of the input groups that are arranged along the first direction L1 in a manner that, for each of the input groups, the detecting signal is outputted to the signal line(s) 115 in the input group simultaneously.

In step S4, the scanning unit 122 scans the output groups sequentially from a first one of the output groups to a last one of the output groups that are arranged along the second direction L2 in a manner that, for each of the output groups, the scan lines 116, if plural, in the output group are scanned simultaneously. It should be noted that steps S3 and S4 are not executed in any specific order and may be executed simultaneously.

In step S5, the reading unit 123 of the processing module 12 of the biometric sensor 1 reads out a plurality of electrical signals respectively of the electrode patterns 117 based on the scanning of the output groups in step S4.

More specifically, in step S3, the detecting signal is sequentially outputted to a first one of the input groups (first input group) that has the $1^{st}$ to $m^{th}$ ones of the signal lines 115, a second one of the input groups (second input group) that has the $(1+t)^{th}$ to $(m+t)^{th}$ ones of the signal lines 115, a third one of the input groups (third input group) that has the $(1+2t)^{th}$ to $(m+2t)^{th}$ ones of the signal lines 115, . . . , and a last one of the input groups (last input group), where t is a positive integer smaller than or equal to m. That is to say, in step S3, the detecting signal is sequentially outputted to the first input group, the second input group, the third input group, . . . , until the detecting signal is outputted to the last one of the signal lines 115. In some embodiments where grouping of the signal lines 115 in step S1 is conducted such that adjacent two of the input groups share one or more common signal lines 115 (i.e., some of the signal lines 115 belong to more than one input group, and each of these signal lines 115 belong to consecutive two or more input groups), t is smaller than m and the detecting signal is outputted repeatedly to the common signal lines 115 in step S3 since the detecting signal is outputted on a group-basis. In embodiments where grouping of the signal lines 115 results in distinct input groups with each input group having distinct signal line(s) 115, t is equal to m and the detecting signal is not outputted repeatedly to any of the signal lines 115.

Specifically, in step S4, the scanning unit 122 sequentially scans a first one of the output groups (first output group) that has the $1^{st}$ to $n^{th}$ ones of the scan lines 116, a second one of the output groups (second output group) that has the $(1+s)^{th}$ to $(n+s)^{th}$ ones of the scan lines 116, a third one of the output groups (third output group) that has the $(1+2s)^{th}$ to $(n+2s)^{th}$ ones of the scan lines 116, . . . , and a last one of the output groups (last output group), where s is a positive integer smaller than or equal to n. That is to say, in step S4, the scanning unit 122 sequentially scans the first output group, the second output group, the third output group, . . . , until the last one of the scan lines 116 is scanned. In some embodiments where grouping of the scan lines 116 in step S2 is conducted such that, adjacent two of the output groups share one or more common scan lines 116 (i.e., some of the scan lines 116 belong to more than one output group, and each of these scan lines 116 belong to consecutive two or more output groups), s is smaller than n and the common scan lines 116 are repeatedly scanned in step S4 since the scanning is conducted on a group-basis. In embodiments where grouping of the scan lines 116 results in distinct output groups with each output group having distinct scan line(s) 116, s is equal to n and none of the scan lines 116 is scanned repeatedly.

In the following illustrative examples, it is assumed that there are ninety-nine signal lines 115 and ninety-nine scan lines 116 (i.e., M=N=99).

Referring to FIG. 2, according to one example of the embodiment, m is two, n is one, t is two, and s is one. The processing module 12 sequentially outputs the detecting signal to the first input group with the $1^{st}$ and $2^{nd}$ signal lines 115 simultaneously receiving the detecting signal, to the second input group with the $3^{rd}$ and $4^{th}$ signal line 115 simultaneously receiving the detecting signal, to the third input group with the $5^{th}$ and $6^{th}$ signal lines 115 simultaneously receiving the detecting signal, . . . , to the second to the last input group with the $97^{th}$ and $98^{th}$ signal lines 115 simultaneously receiving the detecting signal, and to the last input group having only the last ($99^{th}$) signal line 115; and the processing module 12 sequentially scans the $1^{st}$ scan line 116 of the first output group, the $2^{nd}$ scan line 116 of the second output group, the $3^{rd}$ scan line 116 of the third output group, . . . , and the $99^{th}$ scan line 116 of the last output group. In this example, the detecting signal is not repeatedly outputted to any of the signal lines 115, and none of the scan lines 116 is repeatedly scanned.

In another example, m is two, n is one, t is one, and s is one. The processing module 12 sequentially outputs the detecting signal to the first input group with the $1^{st}$ and $2^{nd}$ signal lines 115 simultaneously receiving the detecting signal, to the second input group with the $2^{nd}$ and $3^{rd}$ signal lines 115 simultaneously receiving the detecting signal, to the third input group with the $3^{rd}$ and $4^{th}$ signal lines 115 simultaneously receiving the detecting signal, . . . , and to the last input group with the $98^{th}$ and $99^{th}$ signal lines 115 simultaneously receiving the detecting signal; and the processing module 12 sequentially scans the $1^{st}$ scan line 116 of the first output group, the $2^{nd}$ scan line 116 of the second output group, the $3^{rd}$ scan line 116 of the third output group, . . . , and the $99^{th}$ scan line 116 of the last output group. The detecting signal is repeatedly outputted to some of the signal lines 115 (i.e., the $2^{nd}$ to the $98^{th}$ signal lines 115).

Referring to FIG. 3, according to another example of the embodiment, m is two, n is two, t is two, and s is two. The processing module 12 sequentially outputs the detecting signal to the first input group with the $1^{st}$ and $2^{nd}$ signal lines simultaneously receiving the detecting signal, to the second input group with the $3^{rd}$ and $4^{th}$ signal lines 115 simultaneously receiving the detecting signal, to the third input group with the $5^{th}$ and $6^{th}$ signal lines 115 simultaneously receiving the detecting signal, . . . , to the second to the last input group with the $97^{th}$ to $98^{th}$ signal lines 115 simultaneously receiving the detecting signal, and to the last input group having only the last ($99^{th}$) signal line 115; and the processing module 12 sequentially scans the first output group with the $1^{st}$ and $2^{nd}$ scan lines 116 being scanned simultaneously, the second output group with the $3^{rd}$ and $4^{th}$ scan lines 116 being scanned simultaneously, the third output group with the $5^{th}$ and $6^{th}$ scan lines 116 being scanned simultaneously, . . . , the second to the last output group with the $97^{th}$ and $98^{th}$ scan lines 116 being scanned simultaneously, and the last output group having only the last ($99^{th}$) scan line 116. In this example, the detecting signal is not repeatedly outputted to any of the signal lines 115, and none of the scan lines 116 is repeatedly scanned.

In another example, m is two, n is two, t is one, and s is one. The processing module 12 sequentially outputs the detecting signal to the first input group with the $1^{st}$ and $2^{nd}$ signal lines 115 simultaneously receiving the detecting signal, to the second input group with the $2^{nd}$ and $3^{rd}$ signal lines 115 simultaneously receiving the detecting signal, to the third input group with the $3^{rd}$ and $4^{th}$ signal lines 115 simultaneously receiving the detecting signal, . . . , and to the last input group with the $98^{th}$ and $99^{th}$ signal line 115 simultaneously receiving the detecting signal; and the processing module 12 sequentially scans the first output group with the $1^{st}$ and $2^{nd}$ scan lines 116 being scanned simultaneously, the second output group with the $2^{nd}$ and $3^{rd}$j scan lines 116 being scanned simultaneously, the third output group with the $3^{rd}$ and $4^{th}$ scan lines 116 being scanned simultaneously, . . . , and the last output group with the $98^{th}$ and $99^{th}$ scan lines 116 being scanned simultaneously. Therefore, the detecting signal is repeatedly outputted to some of the signal lines 115 (i.e., the $2^{nd}$ to the $98^{th}$ signal lines 115), and some of the scan lines 116 (i.e., the $2^{nd}$ to the $98^{th}$ scan lines 116) are repeatedly scanned.

In the above-mentioned examples, a number of scans is only less than a number of the scan lines 116 by one. Compared with a conventional manner that scans one scan line at a time, the number of scans and the resolution of the method according to embodiments of this disclosure are comparable to those of the conventional manner. In addition, some of the scan lines 116 are repeatedly scanned, and therefore noise that disturbs the electrical signals can be reduced (i.e., signal-to-noise ratio is increased), and thus the electrical signals are enhanced accordingly.

Referring to FIG. 4, according to another example of the embodiment, m is two, n is three, t is two, and s is three. The processing module 12 sequentially outputs the detecting signal to the first input group with the $1^{st}$ and $2^{nd}$ signal lines 115 simultaneously receiving the detecting signal, to the second input group with the $3^{rd}$ and $4^{th}$ signal lines 115 simultaneously receiving the detecting signal, to the third input group with the $5^{th}$ and $6^{th}$ signal lines 115 simultaneously receiving the detecting signal, . . . , to the last input group with the $97^{th}$ and $98^{th}$ signal lines 115 simultaneously receiving the detecting signal, and to the last input group having only the last ($99^{th}$) signal line 115; and the processing module 12 sequentially scans the first output group with the $1^{st}$ to $3^{rd}$ scan lines 116 being scanned simultaneously, the second output group with the $4^{th}$ to $6^{th}$ scan lines 116 being scanned simultaneously, the third output group with the $7^{th}$ to $9^{th}$ scan lines 116 being scanned simultaneously, . . . , and the last output group with the $97^{th}$ to $99^{th}$ scan lines 116 being scanned simultaneously. In this example, the detecting signal is not repeatedly outputted to any of the signal lines 115, and none of the scan lines 116 is repeatedly scanned.

In another example, m is two, n is three, t is one, and s is one. The processing module 12 sequentially outputs the detecting signal to the first input group with the $1^{st}$ and $2^{nd}$ signal lines 115 simultaneously receiving the detecting signal, to the second input group with the $2^{nd}$ and $3^{rd}$ signal lines 115 simultaneously receiving the detecting signal, to the third input group with the $3^{rd}$ and $4^{th}$ signal lines 115 simultaneously receiving the detecting signal, . . . , and to the last input group with the $98^{th}$ and $99^{th}$ signal lines 115 simultaneously receiving the detecting signal; and the processing module 12 sequentially scans the first output group with the $1^{st}$ to $3^{rd}$ scan lines 116 being scanned simultaneously, the second output group with the $2^{nd}$ to $4^{th}$ scan lines 116 being scanned simultaneously, the third output group with the $3^{rd}$ to $5^{th}$ scan lines 116 being scanned simultaneously, . . . , and the last output group with the $97^{th}$ to $99^{th}$ scan lines 116 being scanned simultaneously. Therefore, the detecting signal is repeatedly outputted to some of the signal lines 115, and some of the scan lines 116 are repeatedly scanned.

In another example, n is three and s is two, the processing module 12 sequentially scans the first output group with the $1^{st}$ to $3^{rd}$ scan lines 116 being scanned simultaneously, the second output group with the $3^{rd}$ to $5^{th}$ scan lines 116 being scanned simultaneously, the third output group with the $5^{th}$ to $7^{th}$ scan lines 116 being scanned simultaneously, . . . , and the last output group with the $97^{th}$ to $99^{th}$ scan lines 116 being scanned simultaneously.

It should be noted that, for each input group with two or more signal lines 115, the signal lines 115 of the input group are applied with the detecting signal simultaneously, and for each output group with two or more scan lines 116, the scan lines 116 of the output group are scanned simultaneously.

From the above description, by the design of one or both of m and n being greater than one, the resolution is reduced such that workload of the processing module 12 for processing the electrical signals can be reduced. In particular, when the detecting signal is repeated outputted to a part of the signal lines 115 and a part of the scan lines 116 is repeatedly scanned by the processing module 12, the effect on noise reduction and signal enhancement is relatively great. Furthermore, if the number of the repeatedly scanned scan lines 116 is adjusted appropriately, noise reduction and signal enhancement can also be achieved without reducing the resolution too much.

Referring back to FIGS. 1, 2 and 5, in step S6, the image-capturing unit 21 of the biometric authentication device 2 converts the electrical signals of the electrode patterns 117 obtained in step S5 from the processing module 12 into the image data.

In step S7, the converting unit 22 of the biometric authentication device 2 analyzes the image data obtained in step S6 to obtain a biometric feature having a plurality of feature points.

In step S8, the authentication unit 23 determines whether arrangement of the feature points of the biometric feature obtained in step S7 is similar to arrangement of the reference points of the feature dataset stored in the authentication unit 23.

For example, the feature points of the biometric feature are minutiae features of a fingerprint. When it is determined that arrangement of the feature points of the biometric feature is similar to arrangement of the reference points of the feature dataset, it can be determined that the biometric feature matches the fingerprint related to the feature dataset stored in the biometric detecting system; otherwise, the biometric feature does not match the fingerprint related to the feature dataset stored in the biometric detecting system.

It should be noted that steps S6 to S8 may be implemented using known techniques and details thereof are omitted herein for the sake of brevity. It should be further noted that steps of the method are not necessarily implemented in the order given above, and some of the steps may be implemented simultaneously.

To sum up, according to the values of m and n that can be set by a user using an input device, the disclosure can control the number of the electrode patterns 117 so as to further control the resolution of the biometric sensor 1 of the biometric detecting system. To achieve a low resolution of the biometric sensor 1, the values of m and n can be set to be relatively large; to achieve a high resolution of the biometric sensor 1, the values of m and n can be set to be relatively small. Since the resolution is controllable by adjusting the values of m and n, the biometric sensor 1 of this disclosure can be applied to biometric detecting systems with different resolution requirements. On the other hand, when the quality of the fingerprint is poor (e.g., a part of the fingerprint is unclear or dirty) or the detecting module 11 of the biometric sensor 1 is partially damaged or unclean, the resolution of the biometric sensor 1 can be adjusted to a low resolution, such that the electrode patterns 117 have relatively large areas, allowing for a relatively clear image data to be generated. In addition, when the resolution of the biometric sensor 1 is adjusted to a low resolution, the biometric sensor 1 can be used as a touch foil for 3C products such as smart phones or tablet computers that only need to recognize one feature point, at the least, or the contour of the finger in order to indicate a position on the touch foil where the finger contacts the touch foil. Furthermore, since the values of m and n can be adjusted to be greater than one, in addition to noise reduction and signal enhancement, when one of the signal lines 115 or one of the scan lines 116 has failed, the disclosure can still obtain the electrical signal of corresponding one of the electrode patterns 117, so black lines in image data can be avoided.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for detecting a biometric feature of humans, to be implemented by a biometric detecting system that includes a biometric sensor, the biometric sensor including a number M of signal lines that are arranged along a first direction and spaced apart from one another, and a number N of scan lines that are arranged along a second direction perpendicular to the first direction and spaced apart from one another, each of the scan lines intersecting with the signal lines, the method comprising steps, by the biometric sensor, of:
   dividing the signal lines into a plurality of input groups each having a number m of consecutive ones of the signal lines, where m is smaller than M;
   dividing the scan lines into a plurality of output groups each having a number n of consecutive ones of the scan lines such that a plurality of electrode patterns are formed and each of the electrode patterns is formed by one of the input groups and one of the output groups, where n is smaller than N and at least one of n or m is greater than one, some of the signal lines are grouped in a manner that each of the some of the signal lines belongs to consecutive two or more of the input groups;
   outputting a detecting signal to the input groups of the signal lines sequentially from a first one of the input groups to a last one of the input groups that are arranged along the first direction in a manner that, for each of the input groups, the detecting signal is outputted to the signal line(s) in the input group simultaneously, and the detecting signal is outputted repeatedly to the some of the signal lines;
   scanning the output groups of the scan lines sequentially from a first one of the output groups to a last one of the output groups that are arranged along the second direction in a manner that, for each of the output groups, the scan line(s) in the output group is(are) scanned simultaneously; and
   reading out a plurality of electrical signals respectively of the electrode patterns based on the scanning of the output groups of the scan lines.

2. The method as claimed in claim 1, the biometric detecting system further including a biometric authentication device that is coupled to the biometric sensor, the method further comprising a step of:
   by the biometric authentication device, converting the electrical signals into image data.

3. The method as claimed in claim 1, wherein the step of reading out a plurality of electrical signals is to obtain, for each of the electrode patterns, a variation of electric field of a capacitor of the electrode pattern as the electrical signal.

4. A method for detecting a biometric feature of humans, to be implemented by a biometric detecting system that includes a biometric sensor, the biometric sensor including a number M of signal lines that are arranged along a first direction and spaced apart from one another, and a number N of scan lines that are arranged along a second direction perpendicular to the first direction and spaced apart from one another, each of the scan lines intersecting with the signal lines, the method comprising steps, by the biometric sensor, of:
   dividing the signal lines into a plurality of input groups each having a number m of consecutive ones of the signal lines, where m is smaller than M;
   dividing the scan lines into a plurality of output groups each having a number n of consecutive ones of the scan lines such that a plurality of electrode patterns are formed and each of the electrode patterns is formed by one of the input groups and one of the output groups, where n is smaller than N and at least one of n or m is greater than one, some of the scan lines are grouped in a manner that each of the some of the scan lines belongs to consecutive two or more of the output groups;
   outputting a detecting signal to the input groups of the signal lines sequentially from a first one of the input groups to a last one of the input groups that are arranged along the first direction in a manner that, for each of the input groups, the detecting signal is outputted to the signal line(s) in the input group simultaneously;
   scanning the output groups of the scan lines sequentially from a first one of the output groups to a last one of the output groups that are arranged along the second direction in a manner that, for each of the output groups, the scan line(s) in the output group is(are) scanned simultaneously, the some of the scan lines are repeatedly scanned; and
   reading out a plurality of electrical signals respectively of the electrode patterns based on the scanning of the output groups of the scan lines.

5. A biometric sensor for detecting a biometric feature of humans, comprising:
   a detecting module including
   a first detecting unit including a number M of signal lines that are arranged along a first direction and spaced apart from one another, and
   a second detecting unit including a number N of scan lines that are arranged along a second direction perpendicular to the first direction and spaced apart from one another, each of said scan lines intersecting with said signal lines; and
   a processing module including
   a setting unit configured to set a first number m for dividing said signal lines into a plurality of input groups each having the number m of consecutive ones of said signal lines, and to set a second number n for dividing said scan lines into a plurality of output groups each having the number n of consecutive ones of said scan lines such that a plurality of electrode patterns are formed and each of the electrode patterns is formed by one of the input groups and one of the output groups, where m is smaller than M, n is smaller than N, and at least one of n and m is greater than one, said setting unit being configured to set the first number m and the second number n in a manner that m is not equal to n,
   a scanning unit configured to
   output a detecting signal to the input groups of said signal lines sequentially from a first one of the input groups to a last one of the input groups that are arranged along the first direction in a manner that, for each of the input groups, the detecting signal is outputted to the signal line(s) in the input group simultaneously, and
   scan the output groups of said scan lines sequentially from a first one of the output groups to a last one of the output groups that are arranged along the second direction in a manner that, for each of the output groups, the scan line(s) in the output group is(are) scanned simultaneously, and a reading unit configured to read out a plurality of electrical signals respectively of the electrode patterns based on the scanning of the output groups of the scan lines.

6. The biometric sensor as claimed in claim 5, wherein said detecting module further includes a dielectric film disposed between said first detecting unit and said second detecting unit, and said reading unit is configured to obtain, for each of the electrode patterns, a variation in electric field of a capacitor of the electrode pattern as the electrical signal.

7. A biometric detecting system comprising:

a biometric sensor as claimed in claim 5; and a biometric authentication device that is coupled to said biometric sensor and that includes an image-capturing unit configured to convert the electrical signals into image data.

8. The biometric detecting system as claimed in claim 7, wherein said biometric authentication device further includes a converting unit configured to analyze the image data to obtain a biometric feature having a plurality of feature points.

9. The biometric detecting system as claimed in claim 8, wherein said biometric authentication device further includes an authentication unit that stores a feature dataset having a plurality of reference points and that is configured to determine whether arrangement of the feature points of the biometric feature is similar to arrangement of the reference points of the feature dataset.

10. The biometric detecting system as claimed in claim 7, wherein said detecting module of said biometric sensor further includes a dielectric film disposed between said first detecting unit and said second detecting unit, and said reading unit is configured to obtain, for each of the electrode patterns, a variation in electric field of a capacitor of the electrode pattern as the electrical signal.

11. The biometric detecting system as claimed in claim 10, wherein said biometric authentication device further includes a converting unit configured to analyze the image data to obtain a biometric feature having a plurality of feature points.

12. The biometric detecting system as claimed in claim 11, wherein said biometric authentication device further includes an authentication unit that stores a feature dataset having a plurality of reference points and that is configured to determine whether arrangement of the feature points of the biometric feature is similar to arrangement of the reference points of the feature dataset.

13. The method as claimed in claim 4, the biometric detecting system further including a biometric authentication device that is coupled to the biometric sensor, the method further comprising a step of:

by the biometric authentication device, converting the electrical signals into image data.

14. The method as claimed in claim 4, wherein the step of reading out a plurality of electrical signals is to obtain, for each of the electrode patterns, a variation of electric field of a capacitor of the electrode pattern as the electrical signal.

* * * * *